(12) United States Patent
Oulès

(10) Patent No.: US 11,373,687 B1
(45) Date of Patent: Jun. 28, 2022

(54) POSE ESTIMATION FOR VIDEO EDITING

(71) Applicant: GoPro, Inc., San Mateo, CA (US)

(72) Inventor: Guillaume Oulès, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/204,903

(22) Filed: Mar. 17, 2021

(51) Int. Cl.
*G11B 27/036* (2006.01)
*G11B 27/00* (2006.01)
*G06V 40/20* (2022.01)

(52) U.S. Cl.
CPC ............ *G11B 27/036* (2013.01); *G06V 40/23* (2022.01); *G11B 27/005* (2013.01)

(58) Field of Classification Search
CPC . G11B 27/036; G11B 27/005; G06K 9/00342
See application file for complete search history.

(56) References Cited

U.S. PATENT DOCUMENTS

2012/0033132 A1* 2/2012 Chen ................. H04N 5/04
348/462
2015/0318020 A1* 11/2015 Pribula ............... H04N 9/8205
386/227

* cited by examiner

*Primary Examiner* — Girumsew Wendmagegn
(74) *Attorney, Agent, or Firm* — Esplin & Associates, PC

(57) ABSTRACT

Pose of a person depicted within a video may be determined. The pose of the person depicted within the video may be used to edit the video. Visual effects may be applied to the video based on the pose of the person depicted within the video. Timing of the video may be remapped to timing of music providing accompaniment for the video edit.

16 Claims, 7 Drawing Sheets video frame A 310 video frame B 320 video frame A 410 video frame B 420 video frame C 430

500

510

520

POSE ESTIMATION FOR VIDEO EDITING

FIELD

This disclosure relates to editing a video using pose of a person depicted within the video.

BACKGROUND

A user may wish to create a video in which movement depicted within the video is synchronized to music of the video. Additionally, a user may wish to synchronize effects in the video to the movement depicted within the video. Manually synchronizing movement depicted within a video to music and effects may be difficult and time-consuming.

SUMMARY

This disclosure relates to editing videos using pose estimation. Video information and/or other information may be obtained. The video information may define a video. The video may include visual content having a progress length. The visual content may include depiction of a person. Pose of the person depicted within the visual content may be determined. Music to provide accompaniment for a video edit of the video may be selected. The video edit of the video may be generated based on the pose of the person depicted within the visual content and/or other information. The video edit may include an edit of the visual content and may include accompaniment of the music.

A system that edits videos using pose estimation may include one or more electronic storage, processor, and/or other components. The electronic storage may store video information, information relating to video, information relating to visual content, information relating to depiction of a person, information relating to pose of the person depicted within the visual content, information relating to music, information relating to video edit, and/or other information.

The processor(s) may be configured by machine-readable instructions. Executing the machine-readable instructions may cause the processor(s) to facilitate editing videos using pose estimation. The machine-readable instructions may include one or more computer program components. The computer program components may include one or more of a video information component, a pose component, a music component, a generation component, and/or other computer program components.

The video information component may be configured to obtain video information and/or other information. The video information may define a video. The video may include visual content having a progress length. The visual content may include depiction of a person;

The pose component may be configured to determine pose of the person depicted within the visual content. In some implementations, determination of the pose of the person depicted within the visual content may include determination of timing of a repeating movement made by the person. In some implementations, determination of the pose of the person depicted within the visual content may further include detection of a highlight movement made by the person.

The music component may be configured to select music. The music may be selected to provide accompaniment for a video edit of the video. In some implementations, the music to provide accompaniment for the video edit of the video may be selected based on the timing of the repeating movement made by the person matching timing of events within the music, and/or other information. In some implementations, the events within the music include a beat, a rhythm, and/or other events.

The generation component may be configured to generate the video edit of the video. The video edit may be generated based on the pose of the person depicted within the visual content, and/or other information. The video edit may include an edit of the visual content and may include accompaniment of the music.

In some implementations, the edit of the visual content may include one or more types of visual effects applied to the visual content. A first type of visual effect applied to the visual content may be selected based on the highlight movement made by the person and/or other information. In some implementations, the first type of visual effect may be a local effect applied to the depiction of the person within the visual content. A second type of visual effect applied to the visual content may be selected based on the repeating movement made by the person, the music, and/or other information. In some implementations, the second type of visual effect may be a global effect applied to entire extent of the visual content.

In some implementations, the edit of the visual content may include change in perceived playback speed of the visual content. The perceived playback speed of the visual content may be changed to match timing of a movement made by the person to timing of events within the music.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
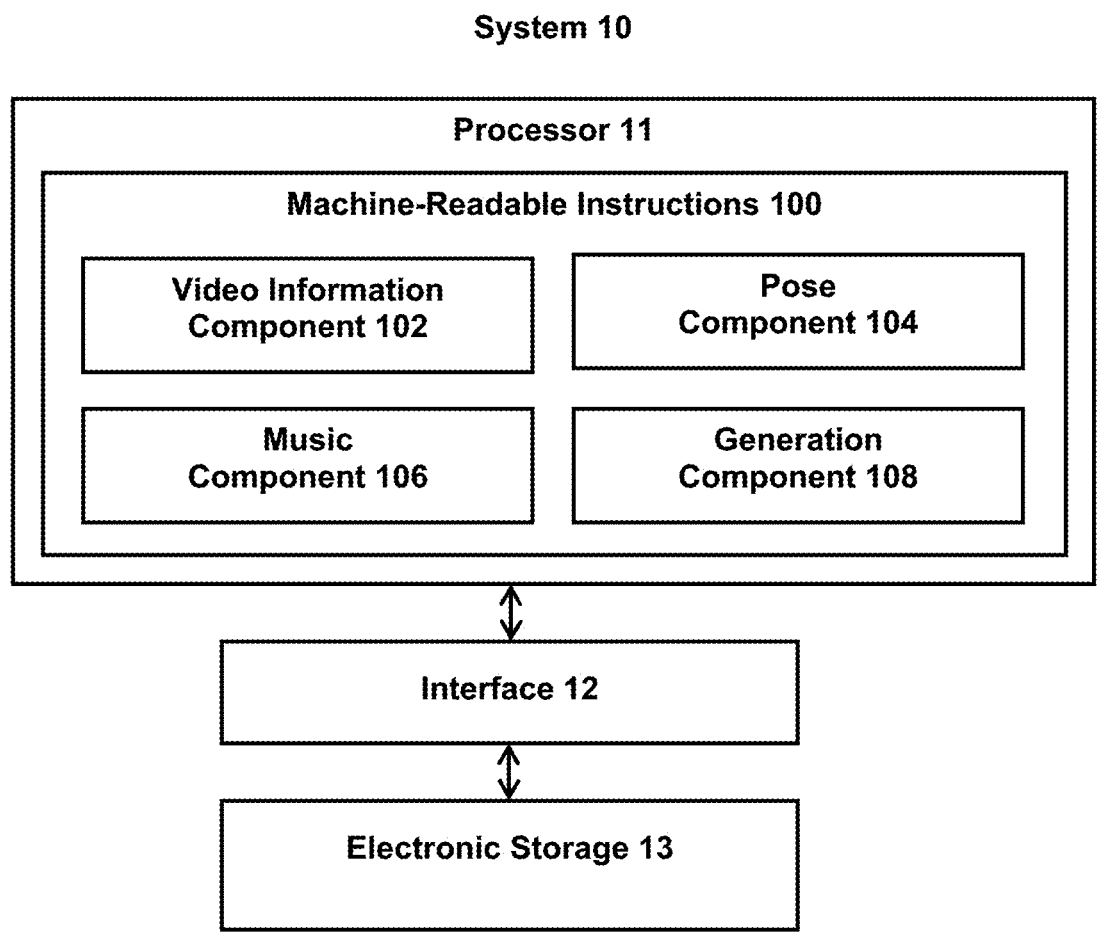
FIG. 1 illustrates a system that edits videos using pose estimation.

FIG. 1 illustrates a system 10 that edits videos using pose estimation. The system 10 may include one or more of a processor 11, an interface 12 (e.g., bus, wireless interface), an electronic storage 13, and/or other components. Video information and/or other information may be obtained by the processor 11. The video information may define a video. The video may include visual content having a progress length. The visual content may include depiction of a person. Pose of the person depicted within the visual content may be determined by the processor 11. Music to provide accompaniment for a video edit of the video may be selected by the processor 11. The video edit of the video may be generated by the processor 11 based on the pose of the person depicted within the visual content and/or other information. The video edit may include an edit of the visual content and may include accompaniment of the music.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to video, information relating to visual content, information relating to depiction of a person, information relating to pose of the person depicted within the visual content, information relating to music, information relating to video edit, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate editing videos using pose estimation. The machine-readable instructions 100 may include one or more computer program components. The machine-readable instructions 100 may include one or more of a video information component 102, a pose component 104, a music component 106, a generation component 108, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video information component 102 may obtain video information from one or more locations. For example, the video information component 102 may obtain information from a storage location, such as the electronic storage 13, electronic storage of information and/or signals generated by one or more sensors, electronic storage of a device accessible via a network, and/or other locations. The video information component 102 may obtain information from one or more hardware components (e.g., an image sensor, a sound sensor) and/or one or more software components (e.g., software running on a computing device).

In some implementations, the video information component 102 may obtain video information based on user interaction with a user interface/application (e.g., video editing application, video player application), and/or other information. For example, a user interface/application may provide option(s) for a user to generate a video edit (e.g., a music-synchronized video edit). The video information defining a video may be obtained based on the user's selection of the video through the user interface/video application. Other selections of video for retrieval of video information are contemplated.

The video information may define a video. The video may include video content (e.g., visual content, audio content) having a progress length. The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

In some implementations, the video content may include spherical video content. The field of view of the visual content of spherical video content may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The visual content of a video may include depiction of one or more persons. One or more video frames of a video may include depiction of one or more persons. For example, the visual content of the video may be captured by an image capture device that includes one or more persons within the field of view of the image capture device. A person may move during capture of the video frames (during capture duration). Depictions of a person may change between the video frames based on the movement of the person during capture of the video frames. That is, due to movement of the person during the capture duration of the video frames, the video frames may include different depictions of the person. The video frames may include depictions of the person in different poses.

Figure 3:
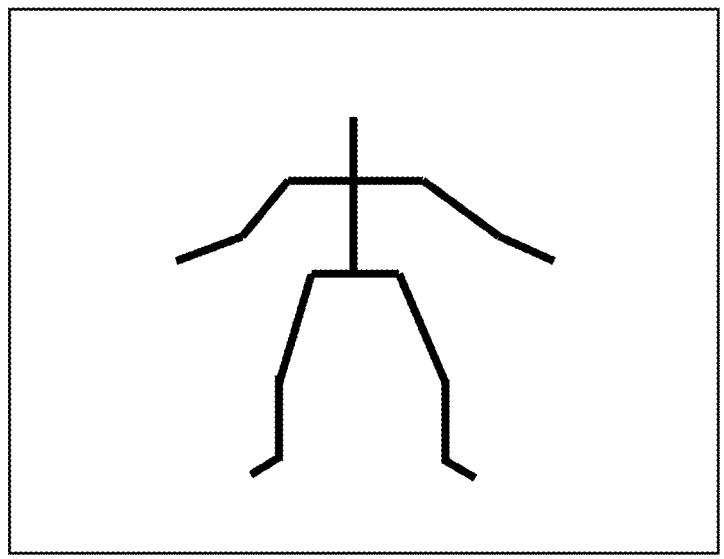
FIG. 3 illustrates example poses of a person depicted within a video.
Figure 3:
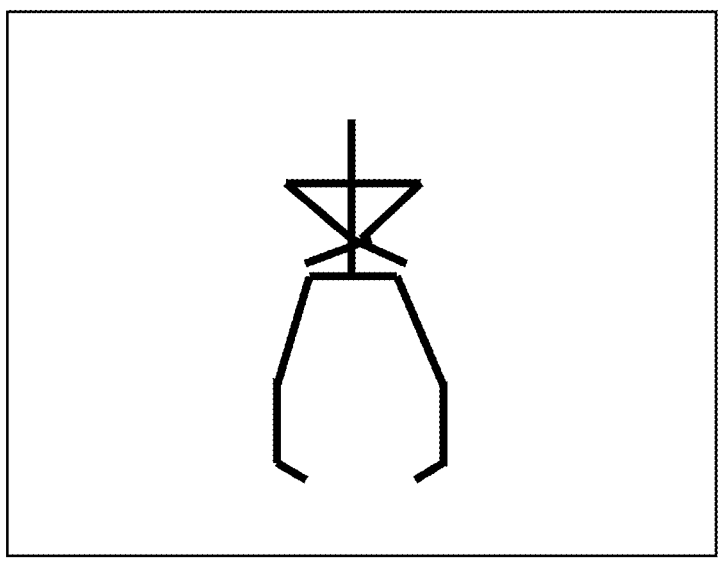
Figure 4:
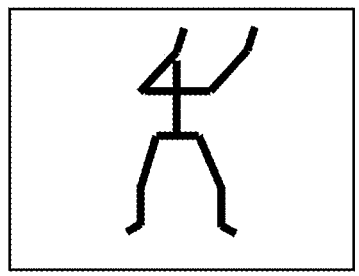
FIG. 4 illustrates example poses of a person depicted within a video.
Figure 4:
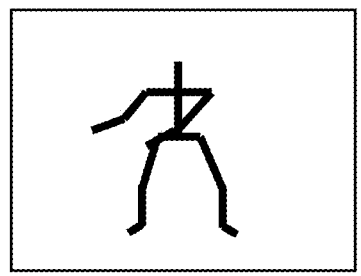
Figure 4:
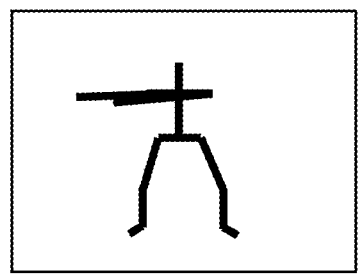

For example, FIGS. 3 and 4 illustrate example poses of a person depicted within a video. Referring to FIG. 3, a video frame A 310 and a video frame B 320 may have been captured by an image capture device pointed at a person. The video frames 310, 320 may include different depictions of the person (e.g., the person in different poses) based on the person having moved between the capture of the video frames 310, 320. For example, the person may have moved during the capture of the video frames 310, 320 by changing their pose—from having their (1) arms extended outwards and (2) feet pointed outwards (captured in the video frame A 310) to having their (1) arms extended inwards and (2) feet pointed inwards (captured in the video frame A 310).

Referring to FIG. 4, a video frame A 410, a video frame B 420, and a video frame C 430 may have been captured by an image capture device pointed at a person. The video frames 410, 420, 430 may include different depictions of the person (e.g., the person in different poses) based on the person having moved between the capture of the video frames 410, 420, 430. For example, the person may have moved during the capture of the video frames 410, 420, 430 by changing their pose—from having their arms raised up and extended to their left (captured in the video frame A 410), to having their arms lowered and extended to their right (captured in the video frame B 420), to having their arms leveled and extended to their right (captured in the video frame C 430).

The pose component 104 may be configured to determine pose of the person(s) depicted within the visual content. The pose of a person may refer to a way/position in which the body of the person is held. The pose of a person may refer to a way/position in which parts of the body of the person is arranged. The pose of a person may change due to the movement of the person. A change in the pose of a person may include change in position of one or more parts of the person's body.

Determining pose of a person depicted within the visual content may include ascertaining, choosing, detecting, establishing, finding, identifying, obtaining, selecting, setting, and/or otherwise determining the pose of the person depicted within the visual content. Determining pose of a person depicted within the visual content may include determining changes in the pose of the person as the function of progress through the progress length of the visual content (e.g., determining change in pose in different video frames of the video). Determining pose of a person depicted within the visual content may include determining type(s) of person made by the person.

Pose of a person depicted within the visual content may be determined based on user selection, analysis of the visual content, and/or other information. User selection of a pose may refer to user input that identifies/designates a particular pose of a person depicted within the visual content. For example, a user may interact with a user interface to select a pose from pose options and/or draw the pose of the person for a particular video frame. Analysis of visual content may include analysis of the content of the video frames of the video, such as analysis of the arrangement of pixels, characteristics of pixels, values of pixels, and/or other aspects of pixels of the visual content. Analysis of visual content may include use of computer vision and/or other object detection/recognition techniques to determine the pose of the person depicted within the visual content. Analysis of visual content may include skeletal estimation of the person depicted within the visual content.

Analysis of visual content may include analysis of speed, velocity, acceleration, frequency, and/or energy of movement depicted within the visual content. For example, analysis of visual content may include determination of velocity/change in velocity along one or more axes. For instance, bouncing feet within visual content may be detected based on velocity/acceleration of the meet along the y-axis within the visual content, in addition to change in sign (positive, negative) of the velocity/acceleration. Frequency analysis of the visual content may include analysis of rate at which movement occurs and/or is repeated over a period of time. Energy analysis of the visual content may include analysis of how much movement is depicted within the visual content (at a point in time, over a duration of time).

In some implementations, determination of the pose of the person(s) depicted within the visual content may include determination of energy of movement made by the person(s). Energy of movement made by a person may refer to strength and/or power of movement made by the person. Energy of movement made by a person may be determined for particular/different time points/video frames within the video. Energy of movement made by a person may be determined for particular/different time duration/sequence of video frames within the video. For example, speed, velocity, and/or acceleration of movement depicted within the visual content may be combined to determine the energy of the movement depicted within the visual content. The energy of the movement depicted within the visual content may be determined for entirety of the visual content (entire field of view of the video frames) and/or for one or more spatial portions of the visual content (e.g., energy around a person). Analysis of the visual content may include determination of where (spatially, temporally) most energetic movements are occurring within the video.

In some implementations, the pose of a person depicted within a particular video frame may be determined further based on the pose(s) of the person within one or more prior video frames and/or one or more subsequent video frames. The pose(s) determined within preceding and/or following video frames may be used limit the pose determination within the video frame. Other determination of the poses of the person(s) depicted within the visual content is contemplated.

In some implementations, determination of the pose of the person(s) depicted within the visual content may include determination of timing of a movement made by the person(s). Timing of a movement made by a person may refer to timing of when the movement is made, started, ended, repeated, and/or otherwise made by the person. Timing of a movement made by a person may refer to timing of one or more sub-parts of the movement made by the person. Timing of a movement made by a person may refer to rhythm of the movement made by the person.

In some implementations, determination of the pose of the person(s) depicted within the visual content may include determination of timing of change in direction of movement (opposite movement) may be the person(s). Change in direction of movement made by a person may refer to change in a course along which the person moves. Change in direction of movement made by a person may include change in direction of one or more parts of the person. In some implementations, change in direction of movement may include change in movement from one direction to an opposite direction. For example, change in direction of movement may include change in movement from one translational direction (e.g., up, left) to the opposite translational direction (e.g., down, right) and/or change in movement from one rotational direction (e.g., clockwise) to the opposite rotational direction (e.g., counter-clockwise). That is, timing of a person making opposite movements may be determined.

In some implementations, determination of the pose of the person(s) depicted within the visual content may include determination of timing of a repeating movement made by the person(s). A repeating movement may refer to a movement made by a person that repeats over the progress length of the visual content. A repeating movement may refer to a movement made by a person that repeats at regular time interval. A repeating movement may refer to a rhythmic movement made by a person. A repeating movement may refer to a movement made by a person that occurs regularly. For example, a repeating movement may include a dancing movement, a walking movement, a running movement, a climbing movement, and/or an exercise movement. Other types of repeating movement are contemplated.

Timing of a repeating movement may refer to a time point or a duration/period of time when the repeating movement is made. Timing of a repeating movement may refer to a time point or a duration/period of time when the repeating movement is started/restarted. Timing of a repeating movement may refer to a length of time that it takes for one cycle of the repeating movement to be performed. In some implementations, a repeating movement may include multiple sub-parts, and timing of a repeating movement may refer to timing of the multiple sub-parts of the repeating movement, such as starting point/duration of individual sub-parts and/or the length of time it takes for individual sub-parts to be performed.

For example, a dance movement may include a person repeating a sequence of four poses, and timing of the dance movement may refer to the length of time it takes for the person to complete the sequence of four poses and/or the length of time it takes for the person to complete individual poses (e.g., take and/or hold individual poses). Timing of the dance movement may refer to regular time points/durations at which the sequence of four poses starts and/or regular time points/durations at which individual poses are made.

As another example, a walking movement may include a person walking at a particular pace, and timing of the walking movement may refer to the length of time it takes for the person to take two steps (e.g., a left step and a right step) and/or the length of time it takes for the person to take one step (e.g., a left step, right step). Timing of the walking movement may refer regular time points/durations at which first step of a two-step pair are taken by the person and/or regular time points/durations at which individual steps are taken by the person.

For example, referring to FIG. 3, a person may make a repeating movement by changing between the poses depicted within the frames 310, 320. The timing of the repeating movement may include the length of time it takes for the person to make/hold the pose depicted within the frame A 310 and/or the pose depicted within the frame B 320. Referring to FIG. 4, a person may make a repeating movement by changing between the poses depicted within the frames 410, 420, 430. The timing of the repeating movement may include the length of time it takes for the person to make/hold the pose depicted within the frame A 410, the pose depicted within the frame B 420, and/or the pose depicted within the frame C 430.

Figure 5A:
FIG. 5A illustrates an example timing of movement depicted within a video.

FIG. 5A illustrates an example timing of movement 500 depicted within a video. The timing of movement 500 may show when certain events with respect to the movement occurs over a time period (e.g., video progress length). Individual bars within the timing of movement 500 may indicate when the events with respect to the movement occurs over the time period. For example, individual bars within the timing of movement 500 may indicate a time point/duration at which the movement or a sub-part of the movement is made, started, ended, and/or repeated.

In some implementations, determination of the pose of the person(s) depicted within the visual content may further include detection of one or more highlight movements made by the person(s). A highlight movement may refer to a movement that is picked out and/or to be emphasized. A highlight movement may refer to a movement that is of interest to a user (of more interest than non-highlight movement). A highlight movement may refer to a movement that is more exciting, interesting, and/or of greater importance than other movement. For example, a highlight movement may include a high energy movement (energy of the movement is greater than a threshold energy value), a system-defined movement (e.g., a movement that is classified as being a highlight movement by default), a user-defined movement (e.g., a movement that is classified as being a highlight movement by a user), and/or other highlight energy movement. In some implementations, a highlight movement may with one or more particular direction, speed, velocity, acceleration, and/or energy of the movement. In some implementations, a highlight movement may be defined with one or more particular poses. For example, a particular hand gesture and/or body posture may be defined as a highlight movement.

The music component 106 may be configured to select music. The music may be selected to provide accompaniment for a video edit of the video. That is, the music may form the musical part of the video edit. The music may be played during playback/presentation of the video edit. The music may include vocal and/or instrumental sounds. The music may have a music progress length (e.g., song duration). The music progress length may be same as or different from the progress length of the video. The music may provide accompaniment for entirety or one or more portions of the video edit of the video.

Selecting music to provide accompaniment for the video edit of the video may include ascertaining, choosing, determining, establishing, finding, identifying, obtaining, setting, and/or otherwise selecting the music. The music to provide accompaniment for the video edit of the video may be selected based on user selection, analysis of the video, and/or other information. User selection of the music may refer to user input that selects particular music as the music that will provide accompaniment for the video edit of the video. For example, user selection of particular may be received via user interaction with one or more options presented on a user interface. Analysis of the video to select the music may include selecting particular music as the music to provide accompaniment based on analysis of the visual content, audio content, metadata, and/or other information relating to the video. For example, different patterns within the video may be associated with different music, and music matching the pattern detected within the video may be selected to provide accompaniment for the video edit of the video. Other selection of music is contemplated.

In some implementations, the music to provide accompaniment for the video edit of the video may be selected based on the timing of the movement made by the person(s) matching timing of events within the music, and/or other information. For example, the music to provide accompaniment for the video edit of the video may be selected based on the timing of opposite movement and/or repeating movement made by the person(s) matching timing of events within the music. An event within the music may refer to a thing that occurs within the music. For example, an event within the music may include a beat, a rhythm, and/or other event within the music. A beat may refer to a basic unit of time of the music. A beat may refer to the pulse of the music. A beat may refer to a basic rhythmic unit of a measure of the music. A rhythm may refer to regular, repeated pattern of movement or sound within the music. A rhythm may refer to a movement marked by regulated succession of strong and weak elements, or of opposite or different conditions.

An event within the music may occur at a point in time or over a duration of time within the music. An event within the music may be repeated within the music. An event within the music may be repeated at regular time interval. An event within the music may occur regularly over the entirety of the music or over one or more portions of the music.

Figure 5B:
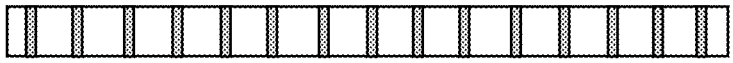
FIG. 5B illustrates example timing of events within music.
Figure 5B:
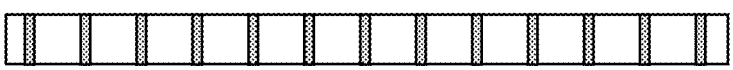

FIG. 5B illustrates example timing of events 510, 520 within two difference pieces of music. The timing of events 510, 520 may show when certain events with respect to the music occurs over a time period (e.g., music progress length). Individual bars within the timing of events 510, 520 may indicate when the events with respect to the music occurs over the time period. For example, individual bars within the timing of events 510, 520 may indicate a time point/duration at which a beat occurs within the music.

The timing of events 510 within the top piece of music may match the timing of movement 500 depicted within the video (shown in FIG. 5A). For instance, the beat of the top piece of music may match the rhythm of movement depicted within the video. Using the top piece of music as the music of the video edit of the video may result in the movement depicted within the video being synchronized to the music. The movement depicted within the video may be synchronized to the top piece of music without any change to timing of the video or the music. For example, sub-parts of the rhythmic movement depicted within the video may be made to the beat of the top piece of music.

The timing of events 520 within the bottom piece of music may not match the timing of movement 500 depicted within the video. For instance, the beat of the bottom piece of music may not match the rhythm of movement depicted within the video. Using the bottom piece of music as the music of the video edit of the video may result in the movement depicted within the video not being synchronized to the music. Without any change to timing of the video or the music, the movement depicted within the video may not be synchronized to the bottom piece of music. For example, sub-parts of the rhythmic movement depicted within the video may not be made to the beat of the bottom piece of music.

The generation component 108 may be configured to generate the video edit of the video. A video edit may refer to a particular arrangement and/or manipulation of one or more portions (e.g., clips) of the video. A video edit may include arrangement of the video with one or more music. A video edit may include one or more visual effects (that change visual characteristics of the video) and/or one or more audio effects (that change audio characteristics of the video). A video edit may include entirety of the video. A video edit, such as a video summary, may include portion(s) of the video content to provide an overview of the video.

The video edit may be generated based on the pose of the person(s) depicted within the visual content, and/or other information. The video edit may include one or more edits of the visual content. An edit of the visual content may include a change to the visual content. An edit of the visual content may include change in one or more visual characteristics of the visual content. An edit of the visual content may include change in one or more temporal characteristics of the visual content.

The video edit may include accompaniment of the music selected by the music component 106. The music selected by the music component 106 may be played during playback/presentation of the video edit. In some implementations, generation of the video edit based on the pose of the person(s) depicted within the visual content may include/refer to selection of the accompanying music for the video edit (by the music component 106) based on the pose of the person(s) depicted within the visual content. For example, generation of the video edit based on the pose of the person(s) depicted within the visual content may include/refer to selection of the accompanying music for the video edit based on the timing of the movement made by the person. The movement made by the person may be the result of change in posses of the person, and the video edit made be generated to include the music with timing that matches the timing of the movement.

Figure 6A:
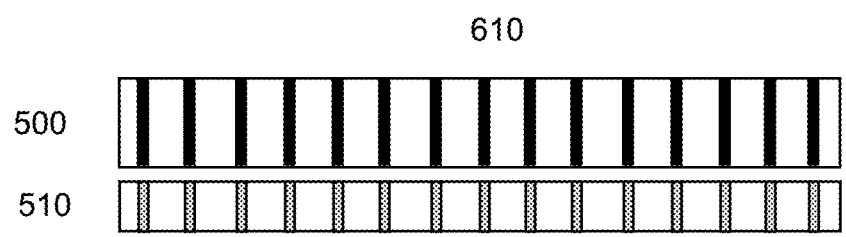
FIG. 6A illustrates an example video edit in which music is selected to match timing of events within music to timing of movement depicted within a video.

FIG. 6A illustrates an example video edit 610 in which music is selected to match timing of events 510 within the music to timing of movement 500 depicted within a video. As shown in FIG. 6A, using the music with the timing of event 510 to provide accompaniment for the video edit of the video having timing of events 510 results in the events within the video happening at the same time as the events within the music. Thus, by selecting the music that has matching timing of events as the video, the video edit may include the visual content of the video synchronized to the music.

In some implementations, generation of the video edit based on the pose of the person(s) depicted within the visual content may include/refer to editing the visual content such that the pose of the person(s) depicted within the visual content matches the music selected to accompany the video edit. For example, generation of the video edit based on the pose of the person(s) depicted within the visual content may include/refer to editing the visual content based on the timing of events within the music so that the timing of the movement made by the person(s) within the edited visual content matches the timing of events within the music.

The visual content may be edited to changing the time of the visual content (time-remap the visual content). The edit of the visual content may include change in perceived playback speed of the visual content. Perceived playback speed of the visual content may refer the speed that is perceived by a person when the visual content is played backed. For example, no change in perceived playback speed of the visual content may result in a person perceiving that the visual content is being played back at normal speed (1× speed). Doubling perceived playback speed of the visual content (e.g., by removing half of the video frames) my result in a person perceiving that the visual content is being played back at twice the normal speed (2× speed).

The perceived playback speed of the visual content may be changed to match the timing of the movement made by the person(s) to the timing of events within the music. In some implementations, matching the timing of the movement made by the person(s) to the timing of events within the music may include changing the perceived playback speed so that events with respect to the movement occurs at the same time as the events within the music. For example, the visual content may be time-remapped so that rhythmic movement depicted within the video are made to the beat of the music. Thus, the perceived playback speed of the visual content may be changed to synchronize movement depicted within the video to the music.

Figure 6B:
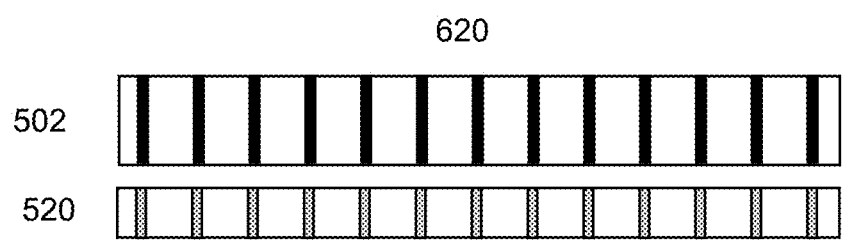
FIG. 6B illustrates an example video edit in which perceived playback speed of a video is changed to match timing of movement depicted within the video to timing of events within music.

FIG. 6B illustrates an example video edit 620 in which perceived playback speed of a video is changed to match timing of movement 502 depicted within the video to timing of events 520 within the music. For example, the timing of movement 502 may be generated by slowing down the perceived playback speed of the video with the timing of movement 500. The perceived playback speed of the video may be slowed down so that events with respect to the movement depicted within the video occurs more slowly than in the original video. The extent to which the perceived playback speed of the video is changed may be controlled by the timing of events 520 within the music. For example, the perceived playback speed of the video may be changed so that movement/sub-part of the movement is made, started, ended, repeated, and/or otherwise made with the beat of the music.

In some implementations, the edit of the visual content may include one or more types of visual effects applied to the visual content. The visual effect(s) applied to the visual content may be determined/selected based on the pose of the person(s) depicted within the visual content. For example, different types of visual effects may be applied based on different types of pose/movement (sequence of pose) made by the person(s) depicted within the visual content. For instance, different types of visual effects may be applied to portions of the video including depiction of a repeating movement versus portions of the video including depiction of a highlight movement. In some implementations, one or more visual effects may be applied based on the music that accompanies the video edit. For example, one or more visual effects may be applied based on the events within the music.

For example, one portion of a video may include depiction of a highlight movement made by a person, and another portion of the video may include depiction of a repeating movement made by the person. A video edit of the video may include music to provide sound for the video edit. One type of visual effect may be applied to the portion including depiction of the highlight movement, with the type of visual effect applied determined based on the highlight movement. A different type of visual effect may be applied to the portion including depiction of the repeating movement, with the type of visual effect applied determined based on the repeating movement and/or the music.

In some implementations, the types of visual effect that may be applied may include one or more local effects and one or more global effects. A local effect may refer to a visual effect that is spatially localized within the visual content. For example, a local effect may refer to a visual effect that is applied to a spatial portion of the visual content. For instance, a local effect may be applied to the depiction of the highlight movement (e.g., applied to depiction of person(s)/part(s) of the person(s) making the highlight movement, applied to surround the depiction of person(s)/part(s) of the person(s) making the highlight movement, applied adjacent to the depiction of person(s)/part(s) of the person(s) making the highlight movement). Applying local effect to the depiction of the highlight movement may emphasize/draw attention to the highlight movement. A global effect may refer to a visual effect that is applied throughout the spatial extent of the visual content. For example, a global effect may refer to a visual effect that is applied to entire spatial extent of the visual content. For instance, a global effect may be applied to depiction of repeating movement within the video.

Figure 7:
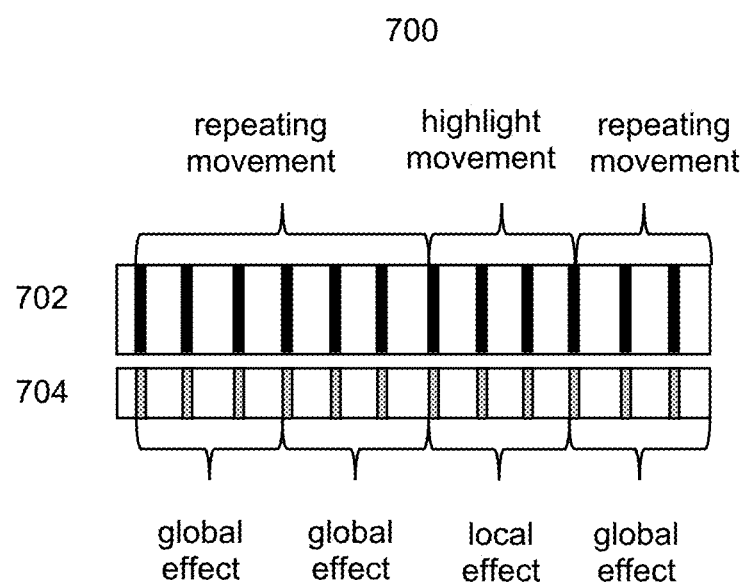
FIG. 7 illustrates example types of visual effects applied to a video based on repeating movement and highlight movement depicted within the video.

FIG. 7 illustrates example an example video edit 700, including visual content 702 and music 704. Different types of visual effects may be applied to the visual content 702 based on depiction of repeating movement and highlight movement within the visual content 702. For example, global effect may be applied to the portions (e.g., time durations) of the visual content including depiction of a repeating movement. Local effect may be applied to the portions of the visual content including depiction of a highlight movement.

The video edit may be generated as encoded video edit (e.g., encoded video file) and/or as instructions for presenting the video edit. For example, the video edit may be generated as an encoded version of a particular video clip, and the video clip may be opened in a video player for presentation on the display(s). The video edit may be generated as instructions identifying portion(s) of the video (e.g., temporal portions, video frames) that are included in the video edit, the order in which the portion(s) appear, the effects (e.g., visual effects, temporal effects) to the applied to the portion(s), and the music to accompany the presentation. A video player may use the instructions to retrieve the portion(s) of the video and the music identified in the instructions for playback.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
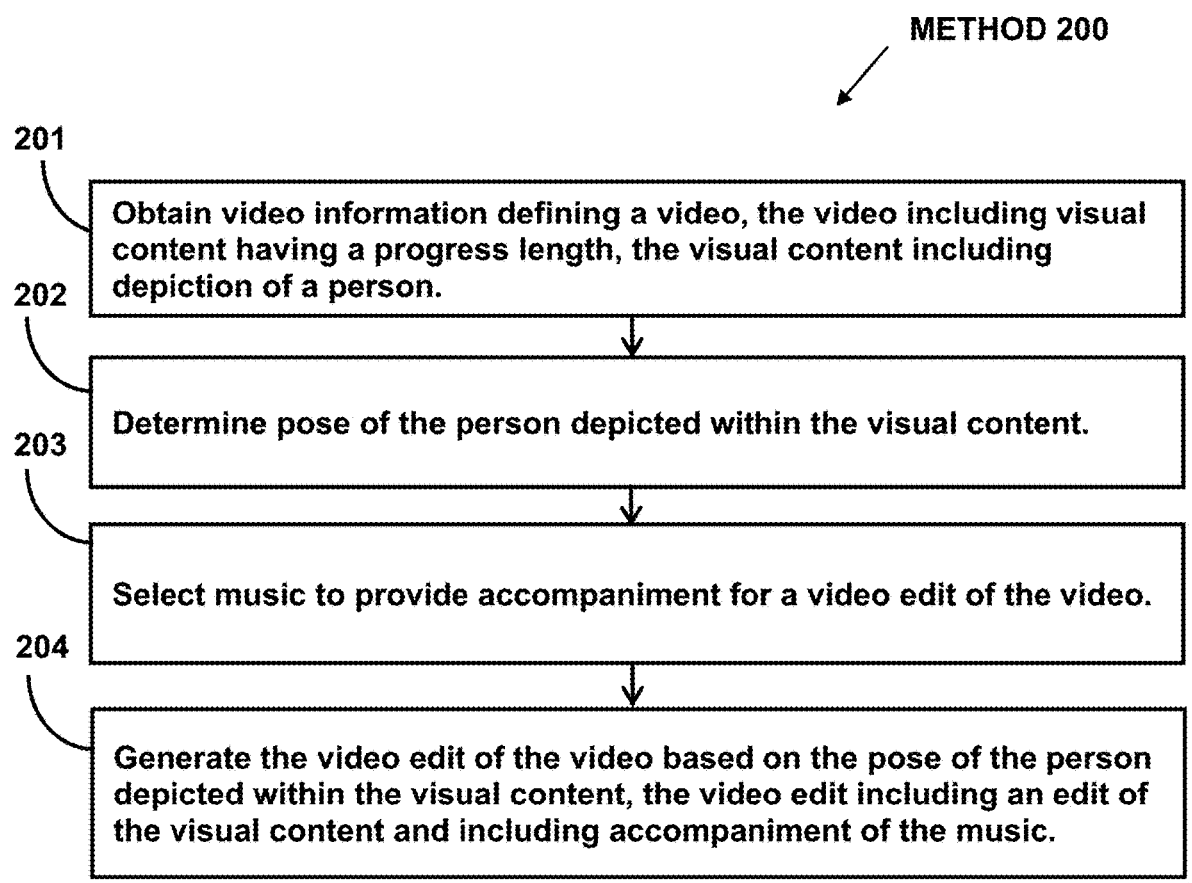
FIG. 2 illustrates a method for editing videos using pose estimation.

FIG. 2 illustrates method 200 for editing videos using pose estimation. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may include visual content having a progress length. The visual content may include depiction of a person. In some implementations, operation 201 may be performed by a processor component the same as or similar to the video information component 102 (Shown in FIG. 1 and described herein).

At operation 202, pose of the person depicted within the visual content may be determined. In some implementations, operation 202 may be performed by a processor component the same as or similar to the pose component 104 (Shown in FIG. 1 and described herein).

At operation 203, music to provide accompaniment for a video edit of the video may be selected. In some implementations, operation 203 may be performed by a processor component the same as or similar to the music component 106 (Shown in FIG. 1 and described herein).

At operation 204, the video edit of the video may be generated based on the pose of the person depicted within the visual content. The video edit may include an edit of the visual content and may include accompaniment of the music. In some implementations, operation 204 may be performed by a processor component the same as or similar to the generation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that edits videos using pose estimation, the system comprising:
one or more physical processors configured by machine-readable instructions to:
obtain video information defining a video, the video including visual content having a progress length, the visual content including depiction of a person;
determine pose of the person depicted within the visual content, wherein determination of the pose of the person depicted within the visual content includes determination of timing of a repeating movement made by the person and detection of a highlight movement made by the person, the highlight movement different from the repeating movement;
select music to provide accompaniment for a video edit of the video; and
generate the video edit of the video based on the pose of the person depicted within the visual content, the video edit including an edit of the visual content and including accompaniment of the music, wherein the edit of the visual content includes different types of visual effects being applied to the visual content based on whether the visual content includes depiction of the person making the repeating movement or the highlight movement.

2. The system of claim 1, wherein the music to provide accompaniment for the video edit of the video is selected based on the timing of the repeating movement made by the person matching timing of events within the music.

3. The system of claim 2, wherein the events within the music include a beat or a rhythm.

4. The system of claim 1, wherein the edit of the visual content includes change in perceived playback speed of the visual content to match timing of a movement made by the person to timing of events within the music.

5. The system of claim 1, wherein the highlight movement includes a movement that is more exciting, more interesting, and/or or greater importance to a user than other movements.

6. The system of claim 5, wherein the highlight movement includes a high energy movement or a particular body posture.

7. The system of claim 1, wherein the different types of visual effects being applied to the visual content based on whether the visual content includes depiction of the person making the repeating movement or the highlight movement includes:
a global effect being applied to entire extent of the visual content based on the visual content includes depiction of the person making the repeating movement; and
a local effect being applied to the depiction of the highlight movement based on the visual content includes depiction of the person making the highlight movement.

8. The system of claim 1, wherein the pose of the person depicted within the visual content is determined based on user interaction with a user interface to draw the pose of the person depicted within the visual content.

9. A method for editing videos using pose estimation, the method performed by a computing system including one or more processors, the method comprising:
  obtaining, by the computing system, video information defining a video, the video including visual content having a progress length, the visual content including depiction of a person;
  determining, by the computing system, pose of the person depicted within the visual content, wherein determining the pose of the person depicted within the visual content includes determining timing of a repeating movement made by the person and detecting a highlight movement made by the person, the highlight movement different from the repeating movement;
  selecting, by the computing system, music to provide accompaniment for a video edit of the video; and
  generating, by the computing system, the video edit of the video based on the pose of the person depicted within the visual content, the video edit including an edit of the visual content and including accompaniment of the music, wherein the edit of the visual content includes different types of visual effects being applied to the visual content based on whether the visual content includes depiction of the person making the repeating movement or the highlight movement.

10. The method of claim 9, wherein the music to provide accompaniment for the video edit of the video is selected based on the timing of the repeating movement made by the person matching timing of events within the music.

11. The method of claim 10, wherein the events within the music include a beat or a rhythm.

12. The method of claim 9, wherein the edit of the visual content includes change in perceived playback speed of the visual content to match timing of a movement made by the person to timing of events within the music.

13. The method of claim 9, wherein the highlight movement includes a movement that is more exciting, more interesting, and/or or greater importance to a user than other movements.

14. The method of claim 13, wherein the highlight movement includes a high energy movement or a particular body posture.

15. The method of claim 9, wherein the different types of visual effects being applied to the visual content based on whether the visual content includes depiction of the person making the repeating movement or the highlight movement includes:
  a global effect being applied to entire extent of the visual content based on the visual content includes depiction of the person making the repeating movement; and
  a local effect being applied to the depiction of the highlight movement based on the visual content includes depiction of the person making the highlight movement.

16. The method of claim 9, wherein the pose of the person depicted within the visual content is determined based on user interaction with a user interface to draw the pose of the person depicted within the visual content.

* * * * *